United States Patent [19]

Uno et al.

[11] Patent Number: 5,488,105
[45] Date of Patent: Jan. 30, 1996

[54] POLYSACCHARIDES OF HYMENAEA SEEDS

[75] Inventors: Yoichiro Uno, Kobe; Fumio Takeno, Osaka; Kazuhiko Yamatoya, Izumisano; Keiji Ohtsu, Nishinomiya, all of Japan

[73] Assignee: Dainippon Pharmaceutical Co., Ltd., Osaka, Japan

[21] Appl. No.: 137,008

[22] PCT Filed: Apr. 18, 1992

[86] PCT No.: PCT/JP92/00502

§ 371 Date: Oct. 14, 1993

§ 102(e) Date: Oct. 14, 1993

[30] Foreign Application Priority Data

Apr. 19, 1991 [JP] Japan ...................... 3-116834

[51] Int. Cl.$^6$ .......................... C07H 1/08; A61K 35/78; A23L 3/00; A23B 7/00
[52] U.S. Cl. .................. 536/128; 536/123; 536/123.1; 426/46; 426/133; 426/654; 424/195.1
[58] Field of Search .................... 424/195.1; 426/133, 426/654, 46; 514/54; 536/128, 123, 123.1

[56] References Cited

U.S. PATENT DOCUMENTS

| | | | |
|---|---|---|---|
| 4,259,358 | 3/1981 | Duthie | 426/46 |
| 4,363,669 | 12/1982 | Cottrell et al. | 106/205 |
| 5,171,570 | 12/1992 | Takemori et al. | 424/195.1 |
| 5,234,825 | 8/1993 | McCleary et al. | 435/101 |

OTHER PUBLICATIONS

Lima et al. *J. Braz. Assoc. Adv. Sci.*, vol. 45(1), pp. 22–26, (1993).

Fry et al. *Physiologia Plantarum*, vol. 89 (1–3), pp. 1–3, (1993).

Mori et al. *Carbohydrate Research*, vol. 84, pp. 125–135, (1980).

Mabusela et al. *Carbohydrate Research*, vol. 203, pp. 336–340, (1990).

*Primary Examiner*—Douglas W. Robinson
*Assistant Examiner*—Howard C. Lee
*Attorney, Agent, or Firm*—Varndell Legal Group

[57] ABSTRACT

A polysaccharide extracted from seeds of a Hymenaea having the following properties: (1) A molecular weight of 5,000–2,000,000, (2) constituent sugars including arabinose, galactose, xylose and glucose, and (3) a main chain of $\beta$-1,4-glucan. The polysaccharides are useful as a thickener, a gelatinizer, a stabilizer for suspension or emulsion, and the like in the field of foods, chemicals and medicaments.

2 Claims, 3 Drawing Sheets

POLYSACCHARIDES OF HYMENAEA SEEDS

TECHNICAL FIELD

The present invention relates to polysaccharides obtained from seeds of Hymenaea plants belonging to the genus Hymenaea, which are utilized as a thickener, a gelatinizer, a stabilizer for suspension or emulsion, and the like in the field of foods, chemicals and medicaments.

BACKGROUND ART

Hitherto, guar gum, locust bean gum and the like have been known as polysaccharides derived from seeds of plants. However, it is difficult to stably supply plant seeds which are raw materials of these polysaccharides, on the grounds such as that the yields thereof are influenced by weather conditions. Thus, a new material as a substitution for them has been searched for a long time.

On the other hand, seeds of Hymenaea, which is a plant growing in the valley of the Amazon, have been resources having little use except that native children sometimes eat powder of the fruit thereof.

DISCLOSURE OF THE INVENTION

The present inventors found that seeds of a Hymenaea plant could give a useful polysaccharide, and accomplished the present invention.

A Hymenaea plant is a high evergreen tree of Leguminosae. The place of origin of a Hymenaea plant is tropical America. It is growing in the area from Brazil to west Indies centering on the valley of the Amazon. Sometimes, a Hymenaea plant is also referred to as Jatoba bean. Examples of Hymenaea plants are *Hymenaea courbaril L., Hymenaea stilbocarpa Hayne, Hymenaea parviforia Hub., Hymenaea intermedia Ducke, Hymenaea palustris Ducke, Hymenaea oblongifolia Hub.*, and the like.

The polysaccharide of the present invention can be prepared for example by the following method:

Seeds from which testae are removed are allowed to absorb sufficient water. Then, the seeds are ground and dried to give a crude polysaccharide. The crude polysaccharide is suspended in an aqueous alkaline-alcohol solution and filtered off. The residue is ground and dried to give a polysaccharide treated with the alkaline-alcohol. This may be subjected to further purification by a conventional method.

According to high performance liquid chromatography (HPLC) (column: OH pak KB-800P, KB80M×2, eluate: 0.05 mol $NaNO_3$), the molecular weight of the above-obtained polysaccharide treated with the alkaline-alcohol was 5,000–2,000,000.

The polysaccharide was subject to hydrolysis in 1N sulfuric acid at 100° C. for 6 hours. An investigation using HPLC revealed that thus obtained constituent sugars were arabinose, galactose, xylose and glucose. The ratio of the constituent sugars was different from a general ratio of constituent sugars of polysaccharide of Tamarind seeds.

When the polysaccharide was allowed to react in the presence of enzyme cellulose "Onozuka" (resistered trade mark) R-10 (β-1,4-glucanase) in a citrate buffer solution (pH 3.8) at 37° C. for 42 hours, it was cleavaged to oligosaccharides. Thus, it was found that the main chain of the polysaccharide was β-1,4-glucan.

Therefore, the polysaccharide of the present invention are obtained from seeds of a Hymenaea plant, and have the following properties:

(1) The molecular weight is 5,000–2,000,000.

(2) The constituent sugars are arabinose, galactose, xylose and glucose.

(3) The main chain is β-1,4-glucan.

The polysaccharide of the present invention further has the following physicochemical properties:

[IR spectrum]

Infrared (IR) spectrum of the polysaccharide of the present invention by the potassium bromide tablet method is as shown in FIG. 1.

[NMR spectra]

Carbon-13 nuclear magnetic resonance ($^{13}C$-NMR) spectrum (at 75 $MH_z$) as to the polysaccharide of the present invention is as shown in FIG. 2. Proton nuclear magnetic resonance ($^1H$-NMR) spectrum (at 300 $MH_z$) as to the polysaccharide of the present invention is as shown in FIG. 3. In both the above cases, heavy water was used as a solvent, and sodium 3-(trimethylsilyl) propionate 2,2,3,3-$d_4$ (TSP-$d_4$) was used as an external standard.

[Viscosity]

The polysaccharide treated with the alkaline-alcohol were heated to dissolve in water at 75° C. for 15 minutes to give 0.65% and 1% aqueous solutions. Viscosity of each solution was measured at 25° C. by means of a Brookfield Model viscometer at 30 rpm. The measured values of the above solutions were 110–120 cps and 500–510 cps, respectively. Furthermore, the polysaccharide treated with the alkaline-alcohol was dissolved in cool water to give 1% aqueous solution. Viscosity of the solution was 420–430 cps.

[Heat resistance]

The polysaccharide treated with the alkaline-alcohol was heated to dissolve in water at 75° C. for 15 minutes to give 0.65% aqueous solution. The solution was heated in an autoclave at 121° C. for 30 minutes, and then, measured at 25° C. by means of a Brookfield Model viscometer at 30 rpm. According to the measurement, the viscosity was 120–130 cps. The persistence of the viscosity was 100%. Thus, the polysaccharide showed high heat resistance. On the other hand, also as to 0.65% and 1% aqueous solutions of polysaccharide of Tamarind seeds, viscosity was measured by the same method as the above. As to the former, the measured value before heating was 29.4 cps, and after heating was 14.1 cps. As to the latter, the measured value before heating was 113 cps, and after heating was 62 cps. The persistence of the viscosity were 48.0% and 54.9%, respectively.

[Acid-heat resistance]

The polysaccharide treated with the alkaline-alcohol was heated to dissolve in water at 75° C. for 15 minutes to give 0.65% aqueous solution. Thereto was added 0.1% of citric acid. The mixture was heated at 100° C. for 30 minutes, and then, measured at 25° C. by means of a Brookfield Model viscometer at 30 rpm. The measured value was 55–60 cps. Thus, the persistence of the viscosity was about 50%. It was found that the acid-heat resistance of the polysaccharide was high.

[Solubility in a solution of sodium chloride]

The polysaccharide treated with the alkaline-alcohol were added to 5% aqueous solution of sodium chloride to get 1% final concentration. It becomes a solution. Viscosity of the resulting solution was measured at 25° C. by means of a Brookfield Model viscometer at 30 rpm. The measured value was 450–460 cps. Thus, the viscosity was stable in the presence of sodium chloride.

[Ability for gelatinization]

When granulated sugar was added to 1% aqueous solution of the polysaccharide treated with the alkaline-alcohol to adjust the brix to 40–50, weak gelatinization occured.

As mentioned above, the polysaccharide of the present invention has characteristics for which it is useful as a thickener, a gelatinizer, a stabilizer for suspension or emulsion, and the like in the field of foods, chemicals and medicaments.

More concretely, the polysaccharide of the present invention has the following characters: possessing viscosity having neither stickiness nor glutinousness; making foods and the like thick and full-bodied; possessing high acid-heat resistance and water holding property; forming gel in the presence of saccharide or alcohol; possessing superior shape-maintaining property; forming fine-grained ice crystals; improving overrun of ice cream; improving melting in mouth; preventing retrogradation of starch; giving heat resistance and resistance for mechanical force to starch; and the like.

Therefore, the polysaccharides of the present invention can be used for various foods, e.g. various sauces such as gravy sauce, soy sauce, seasoning soy, batter, dressing, mayonnaise, coffee flavored milk, fruit juice drink, retorted food, food for microwave oven, yoghurt, jelly, marmalade, jam, ice cream, sherbet, filling, flour paste, custard cream, starch jelly, pie, sponge cake, cake, bread, noodles, curry, stew, instant soup, structured foods, meat products, topping, pet foods, effectively.

Usually, content of the added polysaccharide of the present invention is in the range of from 0.05 to 3.0%.

The polysaccharide of the present invention may be used together with xanthan gum, guar gum, locust bean gum, tamarind gum, carrageenan, gellan gum, or the like.

BEST MODE FOR CARRYING OUT THE INVENTION

Figure 1:
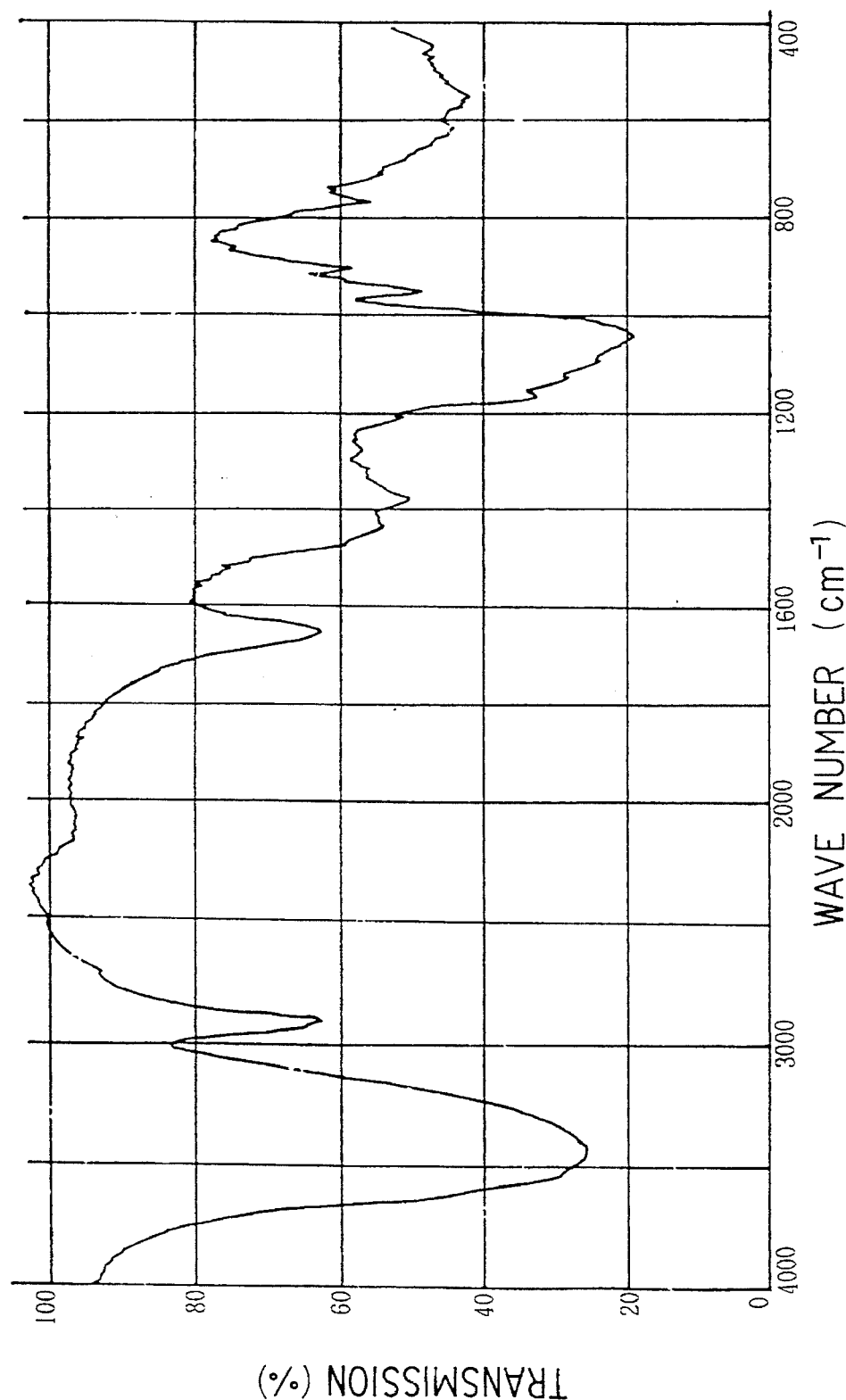
FIG. 1 shows IR spectrum of the polysaccharide obtained in Example 1 (3).
Figure 2:
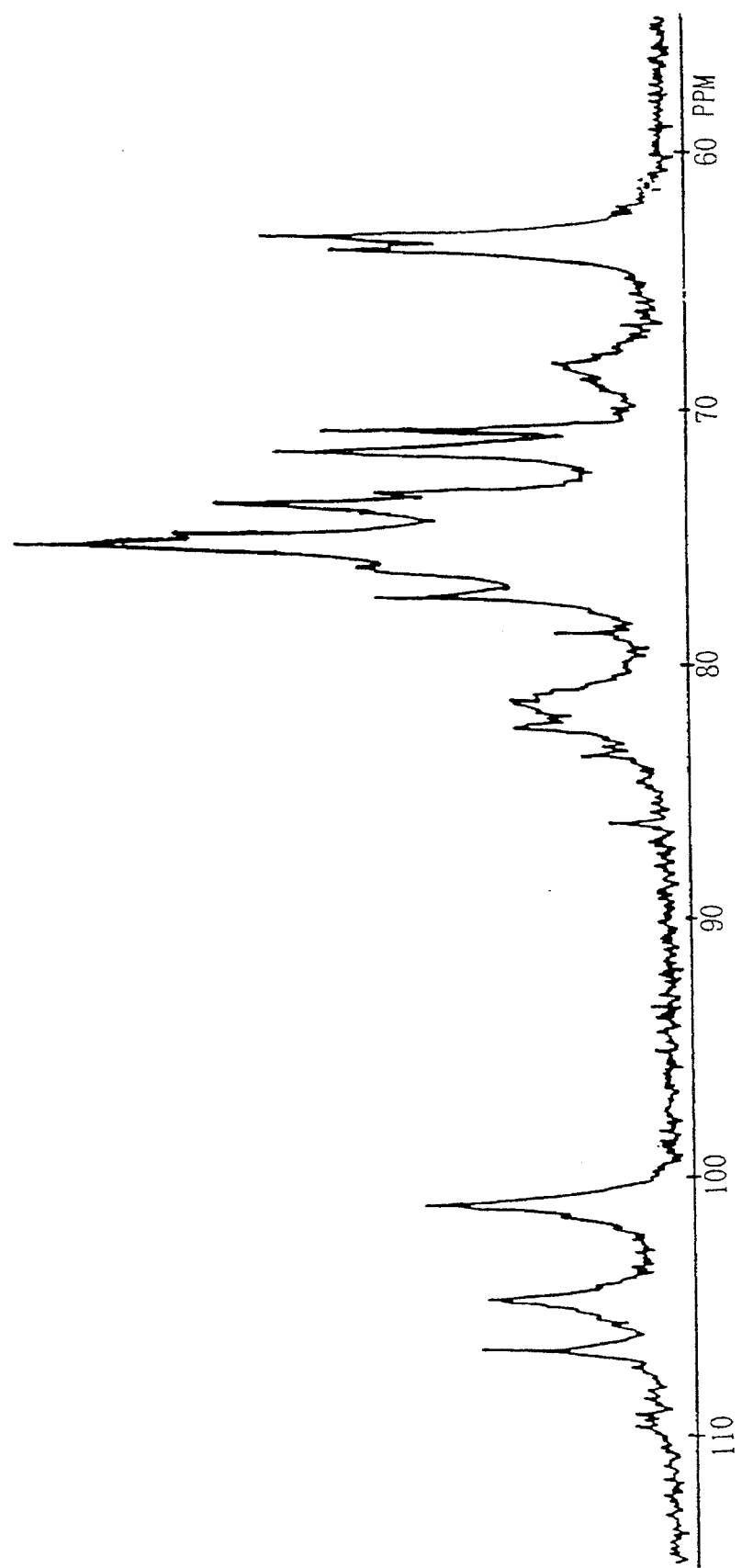
FIG. 2 shows $^{13}$C-NMR spectrum of the polysaccharide obtained in Example 1 (3).
Figure 3:
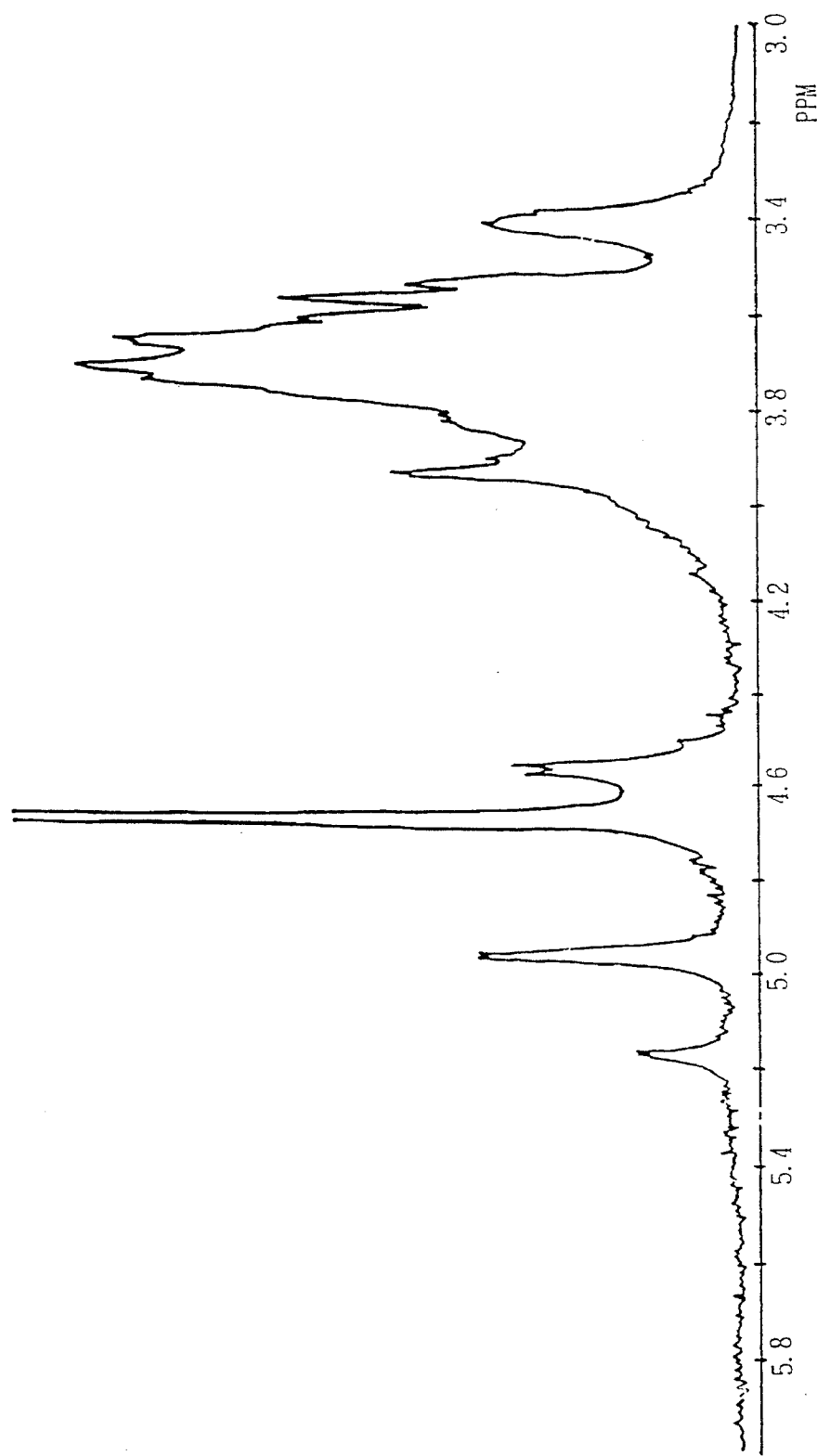
FIG. 3 shows $^{1}$H-NMR spectrum of the polysaccharide obtained in Example 1 (3).

The present invention is more specifically explained by means of the following Examples. All per cents are by weight unless otherwise noted.

EXAMPLE 1

Method for preparing polysaccharide of the present invention (1) Method for preparing crude polysaccharide One hundred grams of seeds of *Hymenaea courbaril* was heated over a fire for 2 minutes. Testae were removed from the seeds by cracking with a hammer. Sixty five grams of the obtained naked seeds was dipped in tap water at 5° C. overnight. The naked seeds was divided into 8 pieces respectively and dipped in hot water at 40° C. for 4 hours. The obtained pieces of seeds were ground by a sample mill, filtered by 1.5 m/m screen and 0.3 m/m screen successively and dried at 70° C. for 3 hours to give 38.9 g of a crude polysaccharide.

(2) Method for preparing alkaline-alcohol treated polysaccharide

One hundred grams of the crude polysaccharide obtained in (1) was dispersed in a mixture of 200 ml of 1% sodium hydroxide and 200 ml methanol, and refluxed at 75°–77° C. for 1 hour. The dispersion was neutralized with methanol-sulfuric acid solution and filtrated. The residue was washed with 50% methanol, dried at 80° C. for 4 hours, and ground by 42 mesh-pass to give 76.8 g of an alkaline-alcohol treated polysaccharide.

(3) Method for preparing rough purified polysaccharide

One hundred grams of the the alkaline-alcohol treated polysaccharide was precipitated by adding 50% ethanol, then washed with acetone, and vacuum-dried at 40° C. to give 98 g of a rough purified polysaccharide.

(4) Physical properties of the rough purified polysaccharide

With respect to the alkaline-alcohol treated polysaccharide obtained in the above (2), molecular weight, viscosity, heat resistance, acid-heat resistance, solubility in a solution of sodium chloride and ability for gelatinization were investigated. With respect to the rough purified polysaccharide obtained in the above (3), constituent sugars, bond of the main chain, IR spectrum and NMR spectrum were investigated. Thus, the results of these investigation were the same as the above description in DISCLOSURE OF THE INVENTION.

EXAMPLE 2

Method for preparing a gravy sauce powder mix

A gravy sauce powder mix was prepared by mixing the materials of following formulation. The formulation of the present invention was referred to as Test formulation. For comparison, a powder mix was also prepared according to Reference formulation.

| (Formulation) | (Test formulation) | (Reference formulation) |
|---|---|---|
| Wheat flour | 39.0% | 41.0% |
| Gravy powder | 11.8 | 11.8 |
| Meat extract | 1.4 | 1.4 |
| Garlic powder | 0.1 | 0.1 |
| Celery | 0.2 | 0.2 |
| White pepper | 0.2 | 0.2 |
| Monosodium glutamate | 2.4 | 2.4 |
| Caramel color | 2.4 | 2.4 |
| Onion flakes | 4.2 | 4.2 |
| Polysaccharide obtained in Example 1 (2) | 2.0 | — |
| Xanthan gum | 3.5 | 3.5 |
| Fat | 4.6 | 4.6 |
| Skimmed milk powder | 9.4 | 9.4 |
| Blown sugar | 9.4 | 9.4 |
| Salt | 9.4 | 9.4 |
| | 100% | 100% |

In one cup of cold water, 24.4 g of the powder mix was dispersed. The dispersion was heated to boil with slow stiring to give gravy sauce. Physical properties of the gravy sauce obtained according to Test formulation or according to Reference formulation were investigated and the results were shown as Table 1.

TABLE 1

|  | Test formulation | Ref. formulation |
| --- | --- | --- |
| Viscosity | 1540 cps | 1070 cps |
| Flow property (TI value) | 0.57 | 0.17 |
| Freezing-thawing stability | 92% | 7.2% |

Method for mesuring

Viscosity: Viscosity was measured at 60° C., 60 rpm by a Brookfield Model viscometer.

Flow property: Viscosities were measured at 60° C., 6 rpm and 60 rpm by a Brookfield Model viscometer. Then, viscosity at 60 rpm/viscosity at 6 rpm ratios were calculated to give TI values. The nearer TI value is to 1.00, the better flow property is recognized.

Freezing-thawing stability:

Residual ratio, which was calculated from the values of viscosity measured at 25° C., 30 rpm, by a Brookfield Model viscometer before and after freezing-thawing was recognized as stability.

Residual ratio of viscosity (%) =

$$\frac{\text{Viscosity after freezing-thawing}}{\text{Viscosity before freezing-thawing}} \times 100$$

As is clear from Table 1, the gravy sauce made according to Test formulation was gravy sauce with good mouthfeel and good flow property.

EXAMPLE 3

Methods for preparing ice cream

The materials of following formulation were stiring at 80° C. for 10 minutes. After dissolving, the mixture was homogenized by a homogenizer and cooled to 5° C. Then, the mixture was overrun until 70–80% by a freezer. Cups were charged with the overrun mixture and allowed to stand at −30° C. for 2 hours to make ice cream. The formulation of the ice cream of the present invention was referred to as Test formulation. For comparison, ice cream was also made according to Reference formulation.

| (Formulation) | (Test formulation) | (Reference formulation) |
| --- | --- | --- |
| Heavy Cream | 15% | 15% |
| Skimmed milk powder | 4 | 4 |
| Sugar | 5 | 5 |
| Butter | 3 | 3 |
| Corn syrup | 7.5 | 7.5 |
| Monoglyceride preparation | 0.3 | 0.3 |
| Polysaccharide obtained in Example 1 (2) | 0.1 | — |
| Locust bean gum | 0.1 | 0.1 |
| Guar gum | 0.1 | 0.1 |
| Water | Balance | Balance |
|  | 100% | 100% |

Physical properties of the ice cream obtained by Test formulation or Reference formulation was investigated. The results are shown in Table 2.

TABLE 2

|  | Test formulation | Ref. formulation |
| --- | --- | --- |
| Overrun | 85% | 71% |
| Shape-maintaining property | 10 min. after | 6 min. after |
| Heat shock resistance | 5.1% | 10.3% |

Method for measuring

Overrun: Overrun 4 minutes after freezing was measured.

Shape-maintaining property:

Ice cream freezed at −25° C. was allowed to stand at 26° C. The time until the ice cream began to dissolve was measured.

Heat shock resistance:

Ice cream was allowed to stand for 4 hours at room temperature (22° C). Then, the ice cream was again freezed in a stocker at −25° C. The cup was cut in half vertically. Height of the ice crystals appeared in the lower part of the cross section was measured. Then, the ratio of appeared ice crystals was calculated as heat shock resistance.

$$\text{Ratio of appeared ice crystals (\%)} = \frac{\text{Height of ice crystals}}{\text{Height of cup}}$$

As is clear from Table 2, ice cream of the present invention was excellent in overrun, shape-maintaining property and heat shock resistance, and further excellent in texture.

EXAMPLE 4

Method for preparing fruit jelly

Materials of the following formulation were stirred at 80° C. for 15 minutes. After dissolving, cups were charged with the mixture. The cups were allowed to stand for 30 minutes at 80° C. to give some fruit jelly. The formulation of the fruit jelly of the present invention was referred to as Test formulation. For comparison, fruit jelly was also made according to Reference formulation.

| (Formulation) | (Test formulation) | (Reference formulation) |
| --- | --- | --- |
| Grape juice concentrated to ⅕ volume | 5% | 5% |
| Isomerized glucose syrup | 16 | 16 |
| Grape flavour | 0.1 | 0.1 |
| Citric acid | 0.16 | 0.16 |
| Trisodium citrate | 0.1 | 0.1 |
| κ-Carrageenun | 1.0 | 1.0 |
| Polysaccharide obtained in Example 1 (2) | 0.1 | — |
| Water | Balance | Balance |
|  | 100% | 100% |

Ratio of syneresis of fruit jelly obtained by Test formulation or Reference formulation investigated. The results are shown in Table 3.

TABLE 3

|  | Test formulation | Ref. formulation |
|---|---|---|
| Ratio of syneresis after 3 days | 0.1 | 3.5 |
| Ratio of syneresis after 10 days | 0.2 | 5.2 |

Method for measuring

Ratio of syneresis (%) =

$$\frac{\text{Syneresis after allowing to stand at 10° C. (g)}}{\text{Weight of gel immediately after preparation (g)}} \times 100$$

As shown in Table 3, the fruit jelly of the present invention is excellent in texture, and stable for a long period without syneresis after storing for 10 days.

INDUSTRIAL APPLICABILITY

The polysaccharide of the present invention is useful as a thickener, a gelatinizer, a stabilizer for suspension or emulsion, and the like in the field of foods, chemicals and medicaments.

We claim:

1. A food additive consisting essentially of a polysaccharide having:
   (a) a molecular weight of 5,000 to 2,000,000;
   (b) arabinose, xylose, glucose and galactose as constituent sugars;
   (c) a main chain β-(1→4)-glucan;
   (d) a viscosity of 110–120 cps when in a 0.65% aqueous solution and when said aqueous solution is heated to 75° C. for 15 minutes; and
   (e) is extracted from the seeds of a Hymenaea plant from an extraction process comprised of the following steps:
      (i) steeping the seeds in water and removing the testae;
      (ii) crushing and drying the seeds to form a crude polysaccharide powder;
      (iii) suspending the crude polysaccharide in an alkaline-alcohol solution to remove impurities and form a purified polysaccharide; and
      (iv) drying and crushing the purified polysaccharide to form a purified polysaccharide powder.

2. A food composition comprising a food product and said food additive of claim 1.

* * * * *